July 13, 1965  L. J. BISHOP  3,194,177
CONVEYOR CONTROL SYSTEM
Filed Aug. 27, 1962  13 Sheets-Sheet 1

INVENTOR.
LEONARD J. BISHOP
BY
*Barnes, Kisselle, Raisch & Choate*
ATTORNEYS

July 13, 1965  L. J. BISHOP  3,194,177
CONVEYOR CONTROL SYSTEM
Filed Aug. 27, 1962  13 Sheets-Sheet 2

INVENTOR.
LEONARD J. BISHOP
BY
Barnes, Kisselle, Raisch & Choate
ATTORNEYS

INVENTOR.
LEONARD J. BISHOP

INVENTOR.
LEONARD J. BISHOP

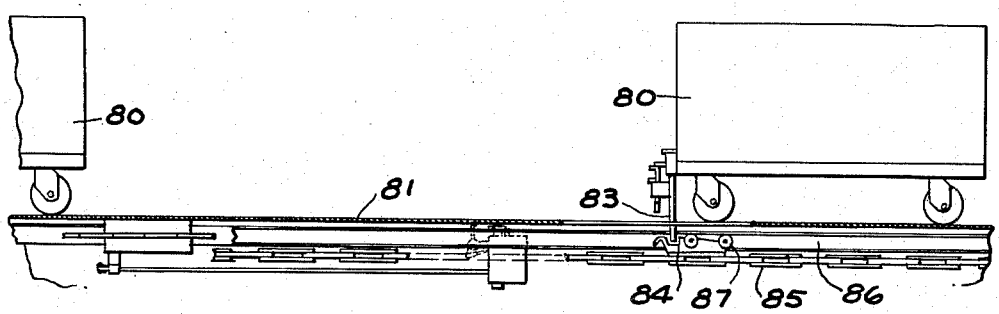
FIG. 11
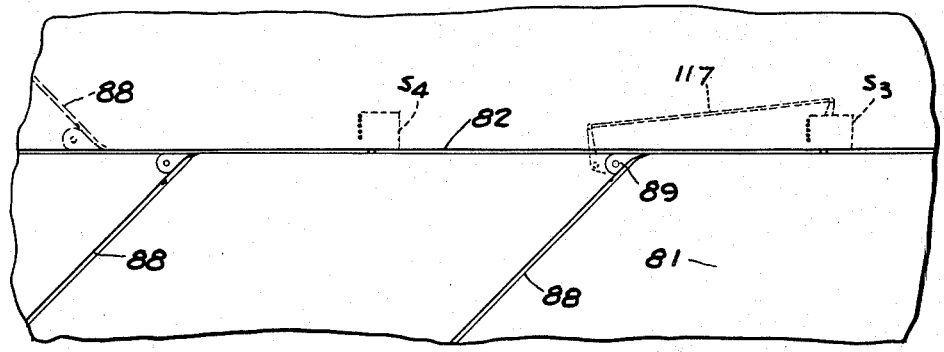
FIG. 12
FIG. 13
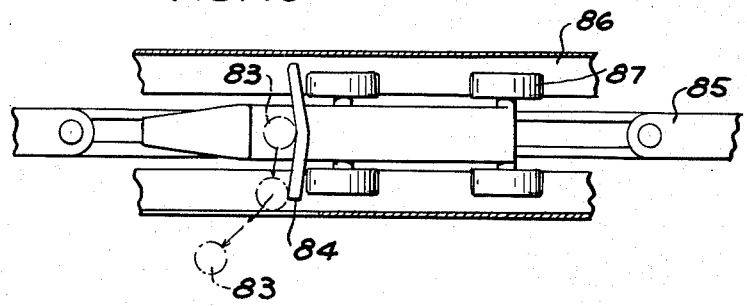

INVENTOR.
LEONARD J. BISHOP
ATTORNEYS

INVENTOR.
LEONARD J. BISHOP

July 13, 1965

L. J. BISHOP 3,194,177

CONVEYOR CONTROL SYSTEM

Filed Aug. 27, 1962

INVENTOR.
LEONARD J. BISHOP
BY
Barnes, Kisselle, Raisch & Choate
ATTORNEYS

July 13, 1965

L. J. BISHOP 3,194,177

CONVEYOR CONTROL SYSTEM

Filed Aug. 27, 1962

INVENTOR.
LEONARD J. BISHOP

BY

Barnes, Kisselle, Raisch & Choate

ATTORNEYS

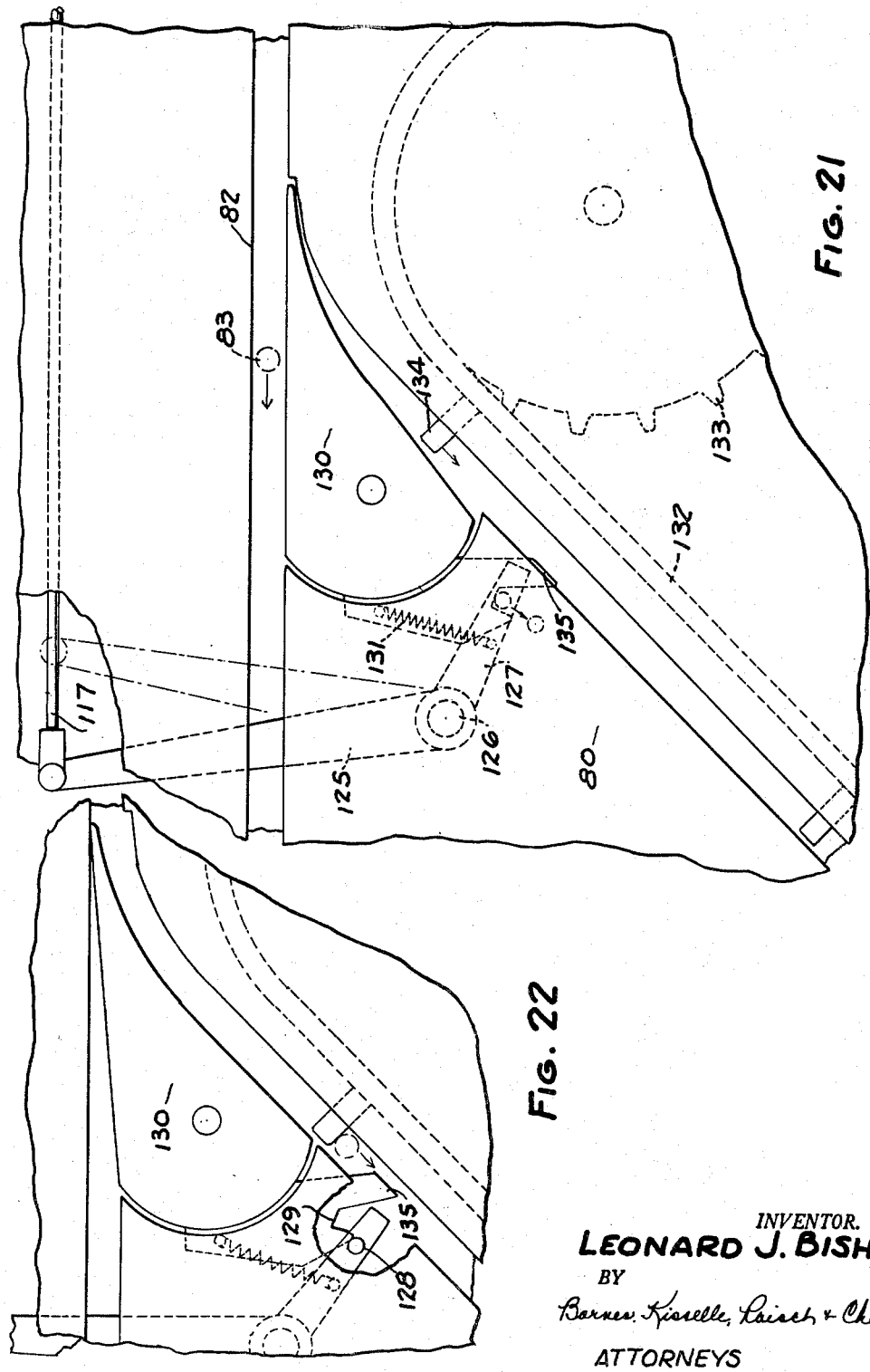

United States Patent Office 3,194,177
Patented July 13, 1965

3,194,177
CONVEYOR CONTROL SYSTEM
Leonard J. Bishop, Birmingham, Mich., assignor to Mechanical Handling Systems Inc., Detroit, Mich., a corporation of Michigan
Filed Aug. 27, 1962, Ser. No. 219,626
40 Claims. (Cl. 104—88)

This invention relates to conveyors such as power and free conveyors, overhead conveyors and sub-floor conveyors.

In conveyor systems wherein a carrier unit is movable along a track, it is essential to provide a control system for producing a responsive signal in accordance with a particular carrier unit to actuate various mechanisms such as a switch for diverting the carrier unit to a branch track or a dumping mechanism. One system that has been used is to provide generally vertically movable signal members or pins on the carrier unit which are selectively positioned so that when the carrier unit moves past a reader station, a signal is produced if the pins are in predetermined relation to a signal reading device at the signal station. In one such system, the pins produce a responsive signal directly. In all such systems heretofore known, the engagement of the pins with members at the reader station and the resultant overriding of the pins produces, in time, a vertical movement of the pin destroying their setting with relation to the carrier unit.

It is an object of this invention to provide a novel conveyor control system wherein a responsive signal is produced without adversely affecting the setting of the pin members.

It is a further object of the invention to provide such a system wherein the pin members do not directly cause the production of the signal.

It is a further object of the invention to provide an overhead power and free conveyor system embodying the above-mentioned features.

It is a further object of the invention to provide a sub-floor conveyor system embodying the aforementioned features.

It is a further object of the invention to provide such a sub-floor conveyor system wherein the signal members are raised above the floor level only when a tow truck passes the reader station.

Basically, the control system comprises an arrangement wherein the control or reader mechanism at the reader station includes at least one and preferably a plurality of sensing members that are movably mounted in such a manner that they are out of engagement or cleared by the signal pins from the carrier unit when a responsive signal is to be produced and are engaged by the signal pins on the carrier unit when a responsive signal is not to be produced. The control mechanism further includes an operating member movably mounted thereon and adapted to be engaged by an actuator on the carrier unit. A linkage is normally conditioned so that when the operating member is moved by a carrier unit passing the reader station, a responsive signal is produced. However, if the signal pins engage the sensing members at the reader station, the linkage is made inoperative so that the subsequent movement of the operating member by the actuator on the carrier unit is not transmitted to produce a responsive signal. Further in accordance with the invention, when the sensing members engage one or more signal pins on the carrier unit, this movement is such that subsequent engagement of the operating member by the actuator on the carrier unit moves the sensing members out of the path of the signal pins and therefore the sensing members do not override and cause any adverse effect upon the setting of the pins. As hereinafter more fully described, the control system is shown as applied to a power and free conveyor system and a sub-floor conveyor system.

In the drawings:

FIG. 11 is a sectional elevational view of a sub-floor conveyor system embodying the invention.

FIG. 12 is a partly diagrammatic plan view of a sub-floor conveyor system embodying the invention.

FIG. 13 is a plan view of the tow chain system used in FIGS. 11 and 12.

FIG. 21 is a fragmentary plan view of the switch track mechanism used in the sub-floor conveyor system.

FIG. 22 is a view similar to FIG. 21 showing the switch tongue in truck diverting position.

The conveyor control system embodying the invention is adapted to be used with various conveyor systems when it is desired to produce a responsive signal as a carrier unit is moved therealong such as a power and free conveyor system, overhead conveyor systems with dumping stations, and sub-floor conveyor systems. As specifically shown and described herein, the control systems are used with overhead power and free conveyors and sub-floor conveyors.

*Overhead power and free conveyor system—general description*

Figure 1:
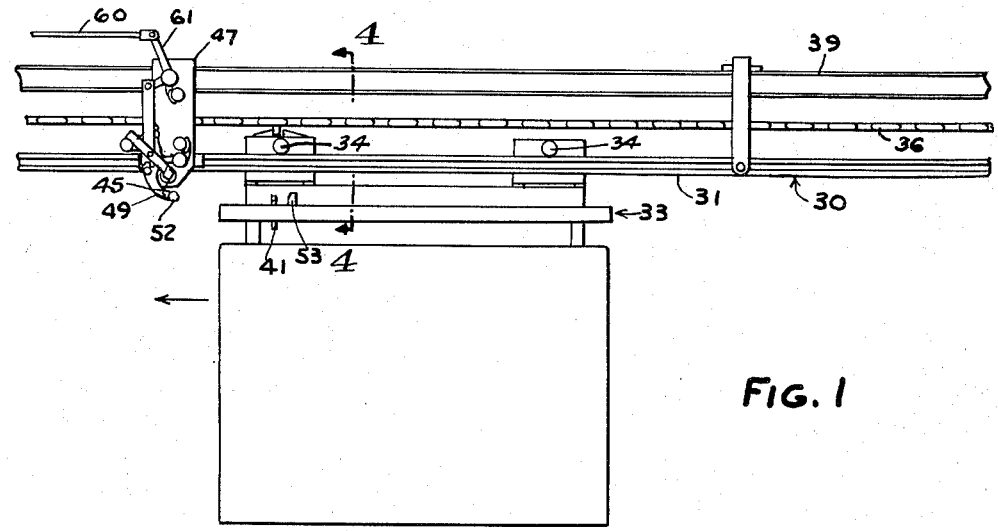
FIG. 1 is a side elevational view of a power and free conveyor system embodying the invention.
Figure 4:
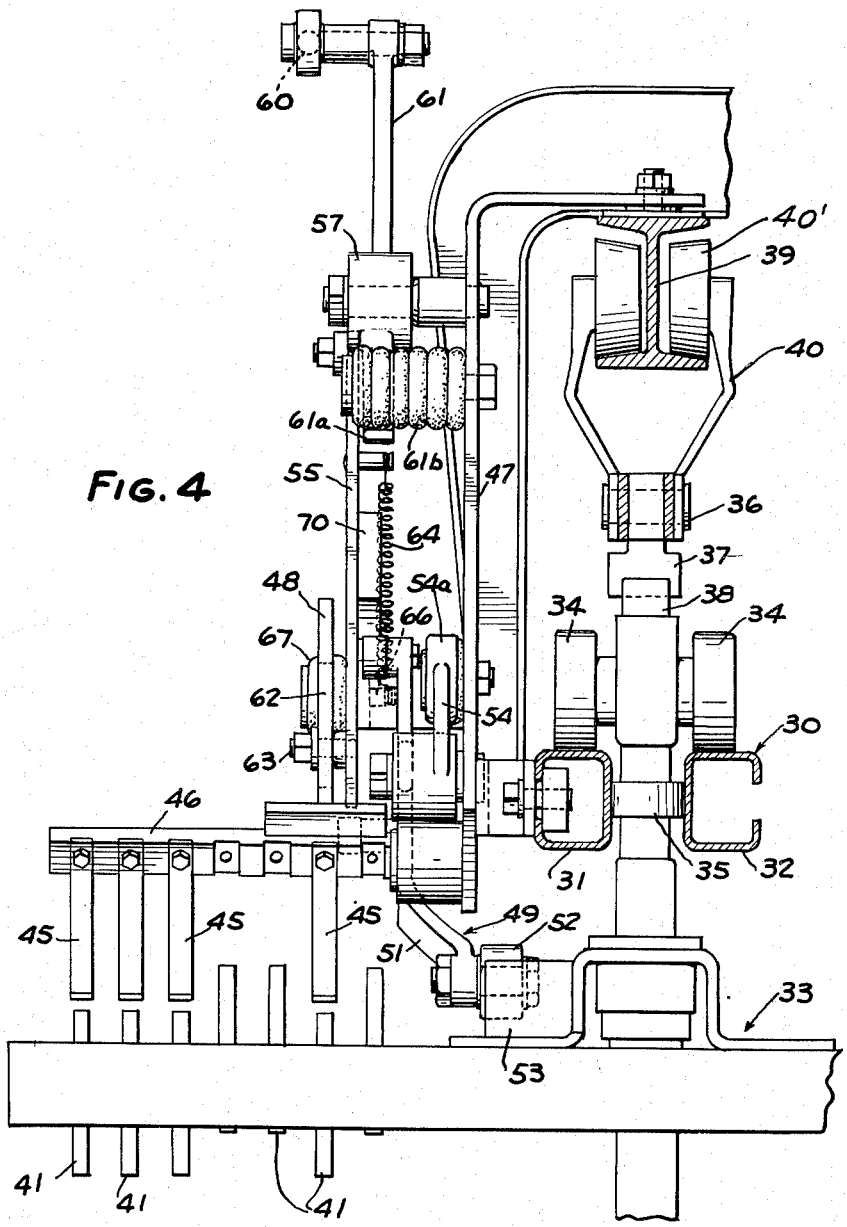
FIG. 4 is a fragmentary sectional view on an enlarged scale taken along the line 4—4 of FIG. 1.

Referring to FIGS. 1 and 4, the overhead power and free conveyor system with which the control system embodying the invention is used is of conventional construction and comprises a track 30 formed by spaced channels 31, 32 for supporting trolley or carrier units 33 for movement therealong. As shown, each trolley or carrier unit includes rollers 34 which ride on the upper surfaces of the channels 31, 32 and a guide roller 35 which rides between the channels 31, 32 to guide the carrier unit. The carrier units are moved along the track 30 by a chain 36 having pushers 37 at longitudinally spaced points thereon for engaging dogs 38 on the carrier units 33. The chain is suspended at longitudinally spaced points from a beam 39 by hanger units 40. Beam 39 forms a track along with the roller 40′ of hanger units 40 roll. As shown in FIG. 1, the carrier unit includes two spaced pairs of support rollers 34 but a single pair may be used for purposes of the invention as will be understood hereinafter.

Figure 2:
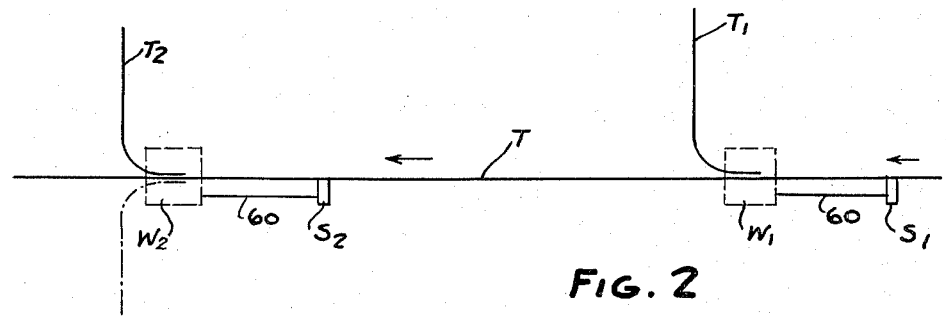
FIG. 2 is a diagrammatic plan view of a power and free conveyor system embodying the invention.

As shown in FIG. 2, which is a diagrammatic plan view of a typical overhead power and free conveyor system, as carrier units are moved along the track T, they may be diverted to branch track $T_1$, $T_2$. The diverting action on the carrier units is preferably controlled by a signal device on the carrier unit itself so that as the carrier unit is moved along, if the signal setting is proper, the carrier unit is diverted. In order to achieve this, it is necessary to produce a responsive signal as the carrier unit moves along the main track T. To achieve this, reader or control stations $S_1$, $S_2$, one for each branch track, are provided along the track and if the signal setting on the carrier units is proper, the reader stations $S_1$ or $S_2$, as the case may be, actuates the switch $W_1$ or $W_2$ to divert the carrier unit to the branch track $T_1$ or $T_2$, respectively.

Figure 3:
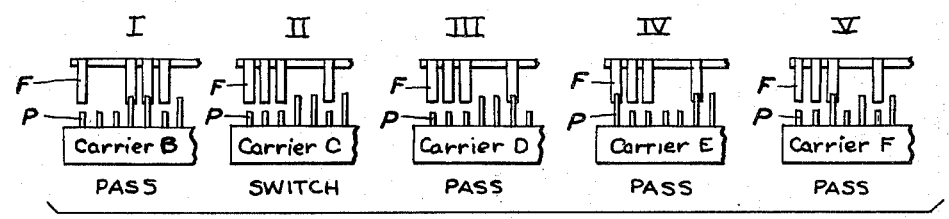
FIG. 3 is a diagrammatic view showing various relationships of the signal pins and the sensing members of the control system.

As shown in FIG. 3, which is a series of diagrammatic elevational views of the relationship of the signal settings on the carrier unit which the signal settings of the reader or control unit, each carrier unit is provided with a plurality of vertically adjustable signal members or pins P which can be selectively adjusted in either an upper or a lower position. Similarly, each reader station is provided with a plurality of downwardly projecting signal sensing members or fingers F. According to the control system embodying the invention as described below, if the pins P are in a position to clear the fingers F as the carrier unit moves through the reader station, a responsive signal is produced and if the pins P are in a position where even one of them engages a finger F, then no responsive signal is produced. Thus, as shown in FIG. 3, in the relationship I, no responsive signal is produced since two of the pins P engage two of the fingers F as the carrier unit moves through the reader station. In position II, a responsive signal is produced since the signal pins P do not engage any of the sensing fingers F. In position III, a responsive signal is not produced since one of the signal pins P engages a sensing finger F. Similarly, in position IV, two of the signal pins P engage two sensing fingers F so that a responsive signal is not produced. As shown in position V, one of the signal pins P engages a sensing finger F and a responsive signal is not produced. The arrangement produces a binary coding system which permits control of a large number of switches $W_1$, $W_2$, etc. with a limited number of signal pins on each carrier unit. Thus, with seven pins per carrier unit, as shown, and with four sensing fingers at each reader station, a maximum of 35 different code signals can be achieved. With eight signal pins per carrier unit and four reader fingers at each reader station, up to 70 signals can be achieved.

*Overhead power and free conveyor system control mechanism*

Referring specifically to FIGS. 4–10, the signal members or pins which correspond to the signal pins P in FIG. 3 are shown as being generally rectangular pins 41 held frictionally in adjusted position on the carrier unit by springs 42. Each signal pin 41 is provided with oppositely facing notches 43, 44. Notch 43 engages flange 43a on the carrier unit to limit the upward movement of the pin and notch 44 engages flange 44a on the carrier unit to limit downward movement of the pin so that the pin can be readily moved either mechanically or manually between an upper and a lower position.

Figure 5:
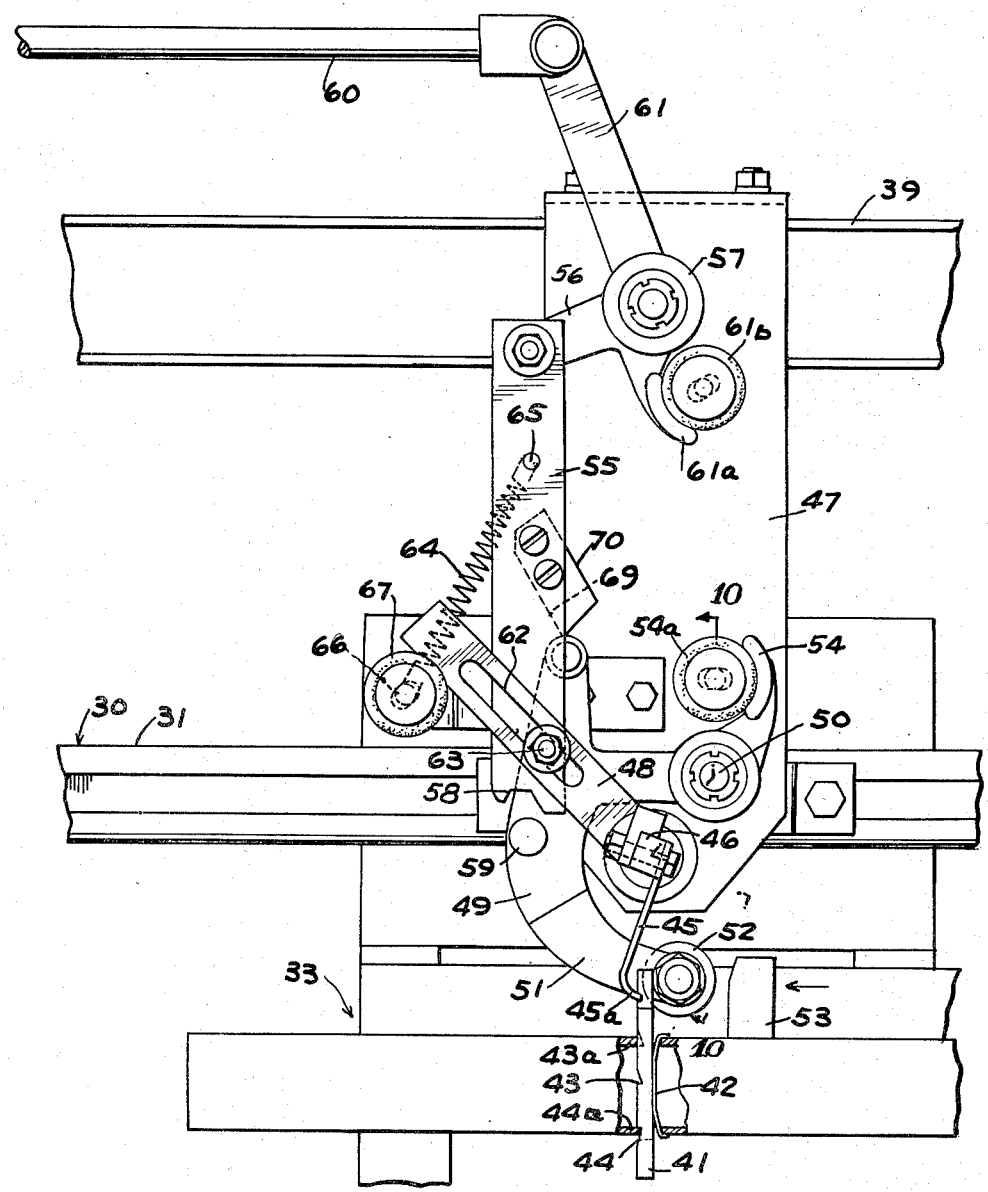
FIG. 5 is a side elevational view of the portion of the apparatus shown in FIG. 4.
Figure 10:
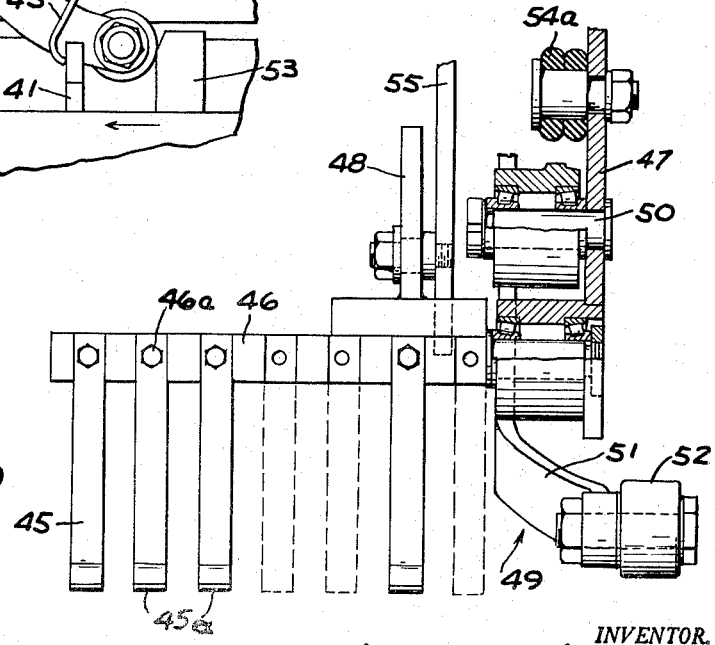
FIG. 10 is a fragmentary sectional view taken along the line 10—10 in FIG. 5.

The elements corresponding to the sensing members or fingers F in FIG. 3 comprise sensing fingers 45 which are fixed on a bar 46 by screws 46a (FIG. 10). Each finger includes a bent end portion 45a that extends normally toward the oncoming pins 41 (FIG. 5). The fingers 45 can be selectively mounted on the bar 46 as desired to determine the proper signal sensing setting for any particular reader station.

As shown in FIGS. 4, 5 and 10, bar 46 is rotatably mounted by roller bearings in a mounted bracket 47 fixed on the beam 39 and track member 31. An arm 48 is fixed to the bar 46 and extends upwardly and forwardly relative to the movement of the carrier unit 33. An operating member or lever 49 is pivoted to the bracket 47 by roller bearings on a pin 50 (FIG. 10). The lower end 51 of lever 49 has a roller 52 thereon which is normally in the path of an actuator in the form of a master dog or projection 53 fixed on the carrier unit 33. The sensing fingers 45 engage or clear the signal pins 41 depending upon whether the signal pins 41 are raised or lowered, respectively. The roller 52 is adapted to be actuated by the actuator 53 regardless of the settting of the pins as each carrier unit passes through the reader station.

Figure 6:
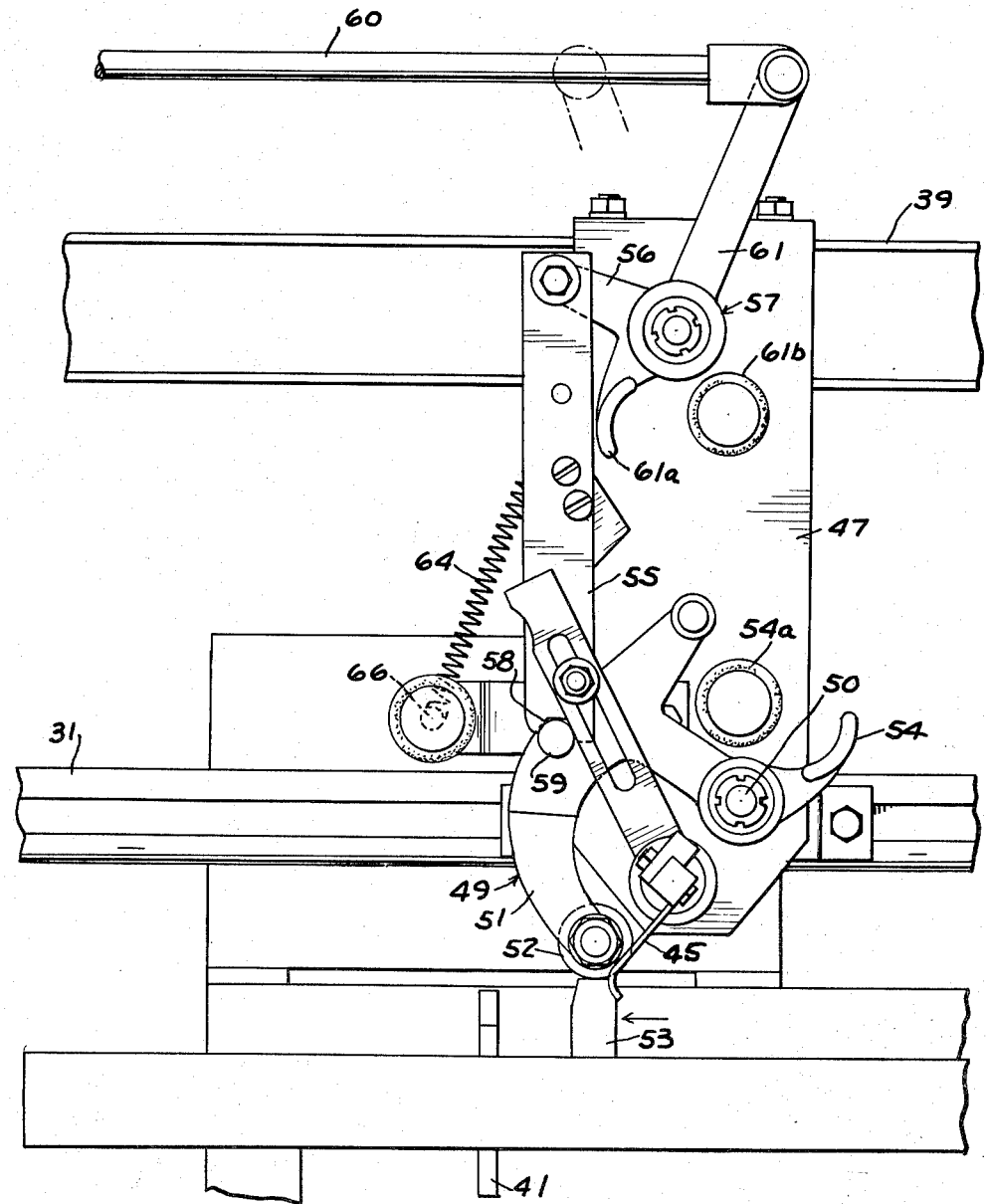
FIG. 6 is a view similar to FIG. 5 showing the relative positions of the parts in a further operative position.

The operating lever 49 is yieldingly urged counter-clockwise (FIG. 5) by its weight to bring a stop arm 54 thereon into engagement with a rubber seathed stop 54a on the bracket 47. The movement of the operating lever 49 is normally adapted to actuate a mechanical signal device for producing a mechanical signal which can be used for actuating a switch or the like. Specifically, this mechanical signal device comprises a link 55 which is pivoted at its upper end to one arm 56 of a bell crank 57 which, in turn, is pivoted on bracket 47. The lower end of the link 55 is formed with a notch 58 that is normally in position for engagement by a pin 59 on the operating lever 49 when the lever is swung clockwise. When the operating lever is swung clockwise by engagement with the actuator 53, the link is moved upwardly swinging the bell crank 57 clockwise (FIG. 6). This swinging movement shifts an actuating rod 60 (which is pivoted at one end to the other arm 61 of the bell crank 57) to the right as shown in FIG. 6. The rod 60 can extend, for example, to the switch shown in FIG. 2 to actuate the switch.

Figure 7:
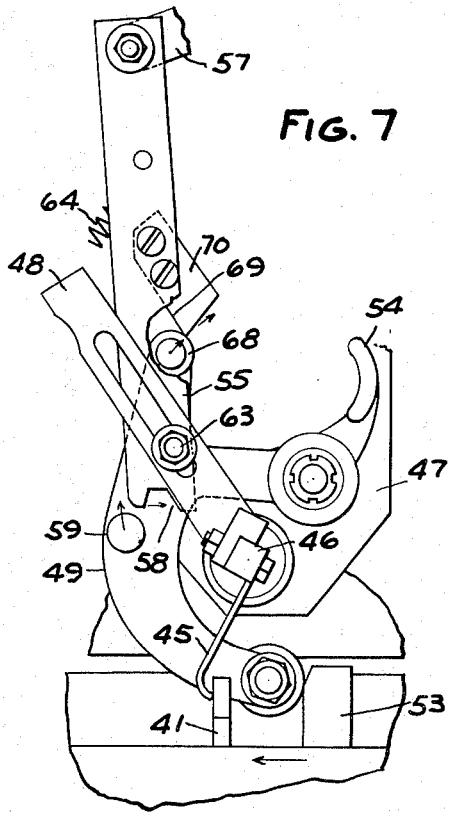
FIG. 7 is a fragmentary view similar to FIG. 5 showing the relative positions of the parts when the setting of the pin members is such that a responsive signal is not produced.
Figure 9:
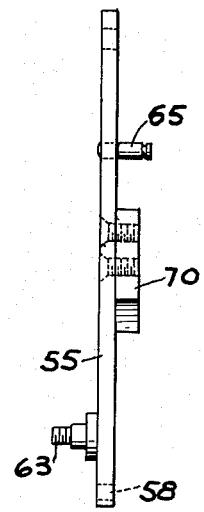
FIG. 9 is an end view of a part of the apparatus shown in FIG. 7.

The aforementioned movement is in the event that the sensing fingers 45 clear the signal pins 41 as the carrier unit moves through the reader station. However, if the signal pins 41 engage one or more of the sensing fingers 45 as shown in FIG. 7, a different mode of operation is obtained. As shown in FIGS. 4 and 5, the arm 48 on the bar 46 is formed with a longitudinally extending slot 62 through which a pin 63 on the link 55 extends. A tension spring 64 extends between point 65 on the upper end of the link 55 and a pin 66 on bracket 47. The spring 64 thus yieldingly urges the arm 48 against a rubber stop 67 on bracket 47. Spring 64 also urges bell crank 57 counterclockwise and tends to hold projection 61a on bell crank 57 against a rubber sheathed stop 61b on bracket 47.

As shown in FIG. 7, if, as the carrier unit moves along its track, one or more of the sensing fingers 45 are contacted by a signal pin 41 on the carrier unit, then the sensing finger 45 is swung clockwise moving, in turn, the arm 48 clockwise which through pin 63 swings the lower end of the link 55 counterclockwise so that, under these conditions, when the operating lever 49 is engaged by the actuator 53 on the carrier unit, the pin 59 on the operating lever clears the notch 58 and the link 55 is not moved upwardly to produce a responsive signal (FIG. 7).

Figure 8:
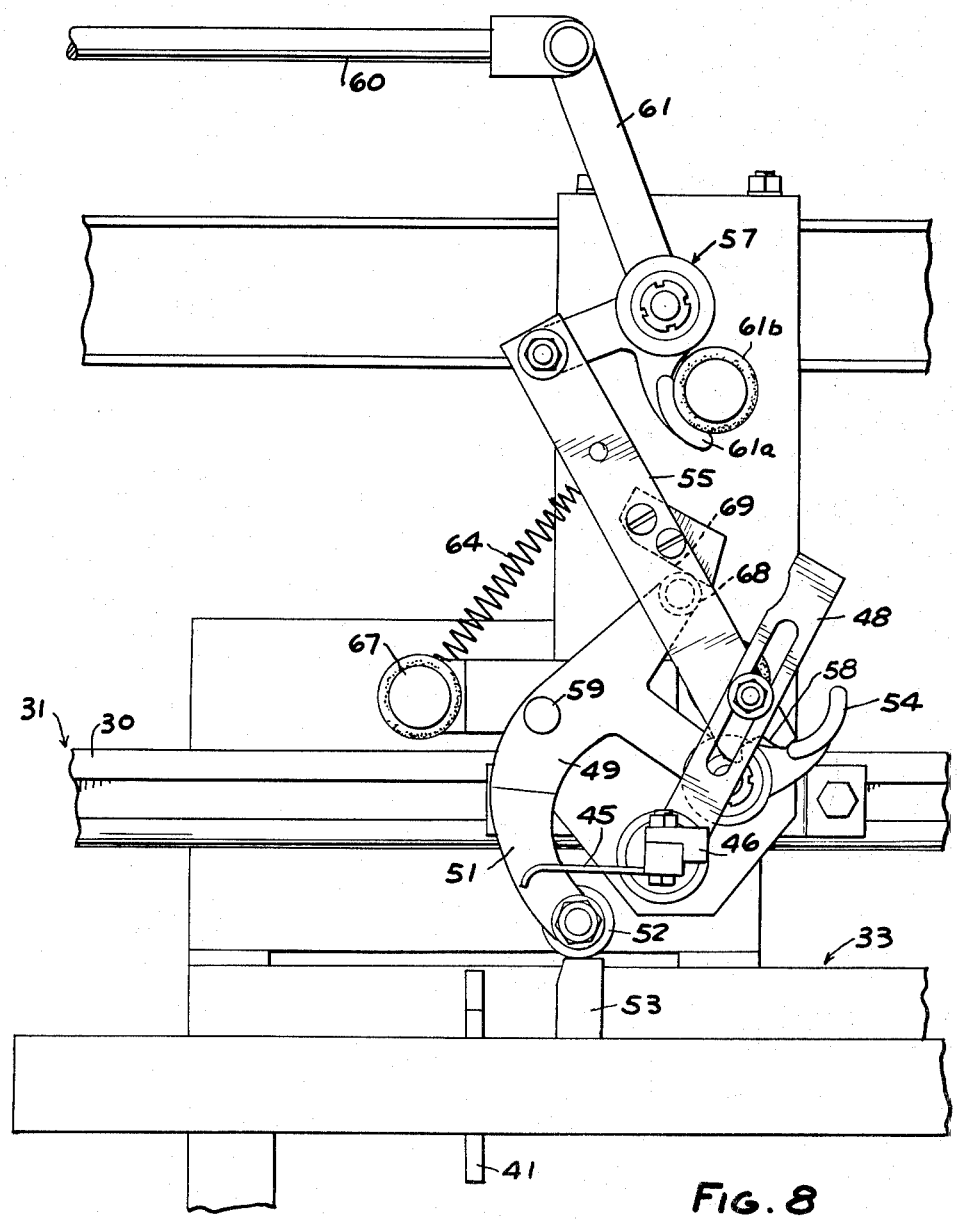
FIG. 8 is a view similar to FIG. 7 showing the relative positions of the parts in a further operative postion when a responsive signal is not being produced.

After performing the function of moving the notch 58 on link 55 out of the path of pin 59 on operating lever 49, the sensing fingers 45 are moved upwardly to clear the upper ends of the signal pins 41 to eliminate any tendency of the sensing fingers 45 to force the signal pins 41 downwardly by sliding engagement with the upper ends of the signal pins 41. As shown in FIGS. 7 and 8, this is achieved by providing a roller 68 on the upper end of operating lever 49 which engages surface 69 of a cam member 70 fixed on the link 55. After a sensing finger 45 is engaged by a pin 41 and link 55 has been swung counterclockwise to the position shown in FIG. 7, thereafter dog 53 swings lever 49 and roller 68 engages the surface 69 swinging the link 55 further counterclockwise and the arm 48 through pin 63 swings the fingers 45 further clockwise into substantially horizontal position wherein they clear the upper ends of the raised pins 41 (FIG. 8).

*Sub-floor conveyor system*

As heretofore mentioned, the control system is also applicable to sub-floor conveyor systems such as shown in FIGS. 11–13. In such a system, wheeled trucks 80 are moved along a floor 81 which has a slot 82. Each truck 80 is conventionally provided with a tow pin 83 that projects downwardly through the slot 82 into engagement with the pusher 84 of a conveyor chain 85 supported on a track 86 by rollers 87. In the handling of trucks 80, it is desirable to periodically switch the trucks to branch tracks formed by slots 88 in the floor 81. This is achieved by actuation of a switch tongue 89 that engages a tow pin 83 to guide it into the slot 88. In accordance with the invention, the control mechanism is provided at reader or control stations $S_3$, $S_4$ and is adapted to be actuated in the event that signal members or pins on the truck 80 are in proper position relative to sensing members on the control mechanism.

*Sub-floor conveyor system control mechanism*

Referring to FIGS. 14–20, a control mechanism for the sub-floor conveyor system is adapted to be mounted adjacent the slot 82 forming the main track in the floor 80 at the reader or control station.

Figure 14:
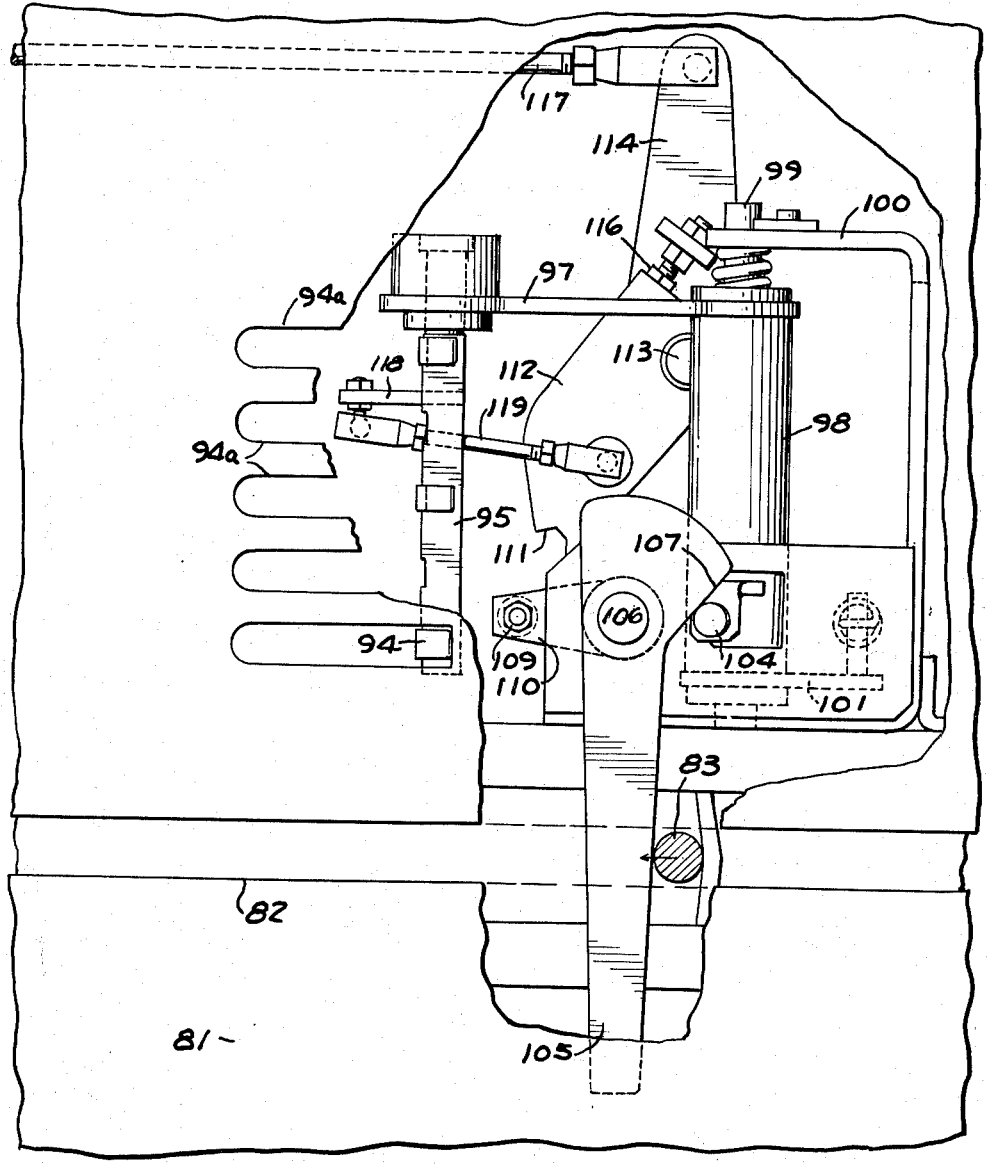
FIG. 14 is a fragmentary part sectional plan view of the control system used in the sub-floor conveyor system.
Figure 15:
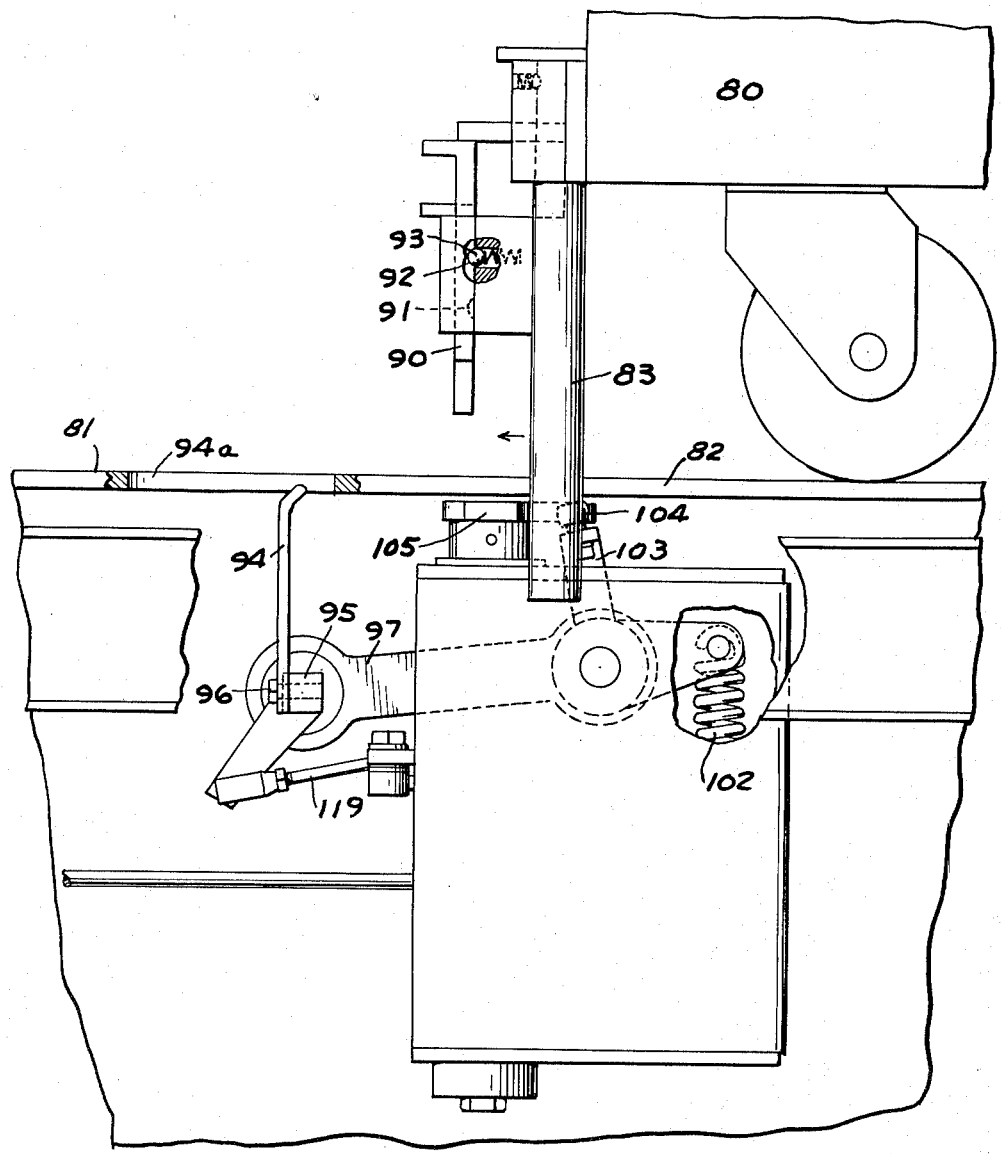
FIG. 15 is a fragmentary elevational view of the system shown in FIG. 14.

As shown in FIG. 15, the truck 80 is provided with a plurality of transversely spaced signal members or pins 90 which are adapted to be positioned to either an upper or a lower position for selectively setting the signal of the truck. Signal pins 90 correspond to signal pins P in FIG. 3 or pins 41 in FIG. 4. As shown, the signal pins 90 are provided with notches or detents 91, 92 that are engaged, respectively, by a spring loaded ball 93 to hold the signal pins in either upper or lower position. Signal sensing members or fingers 94 are selectively mounted on a bar 95 by screws 96. Sensing fingers 94 correspond to the sensing fingers F in FIG. 3 or fingers 45 in FIG. 4. The bar 95 is rotatably mounted below floor 81 on an arm 97 (FIG. 14) which is fixed on a sleeve 98 which is pivoted on shaft 99 mounted on a bracket 100. An arm 101 on the sleeve 98 projects outwardly in an opposite direction from the lever 97 and a tension spring 102 extends between the end of the arm 101 and bracket 100 to partially counterbalance the reader finger assembly.

Figure 16:
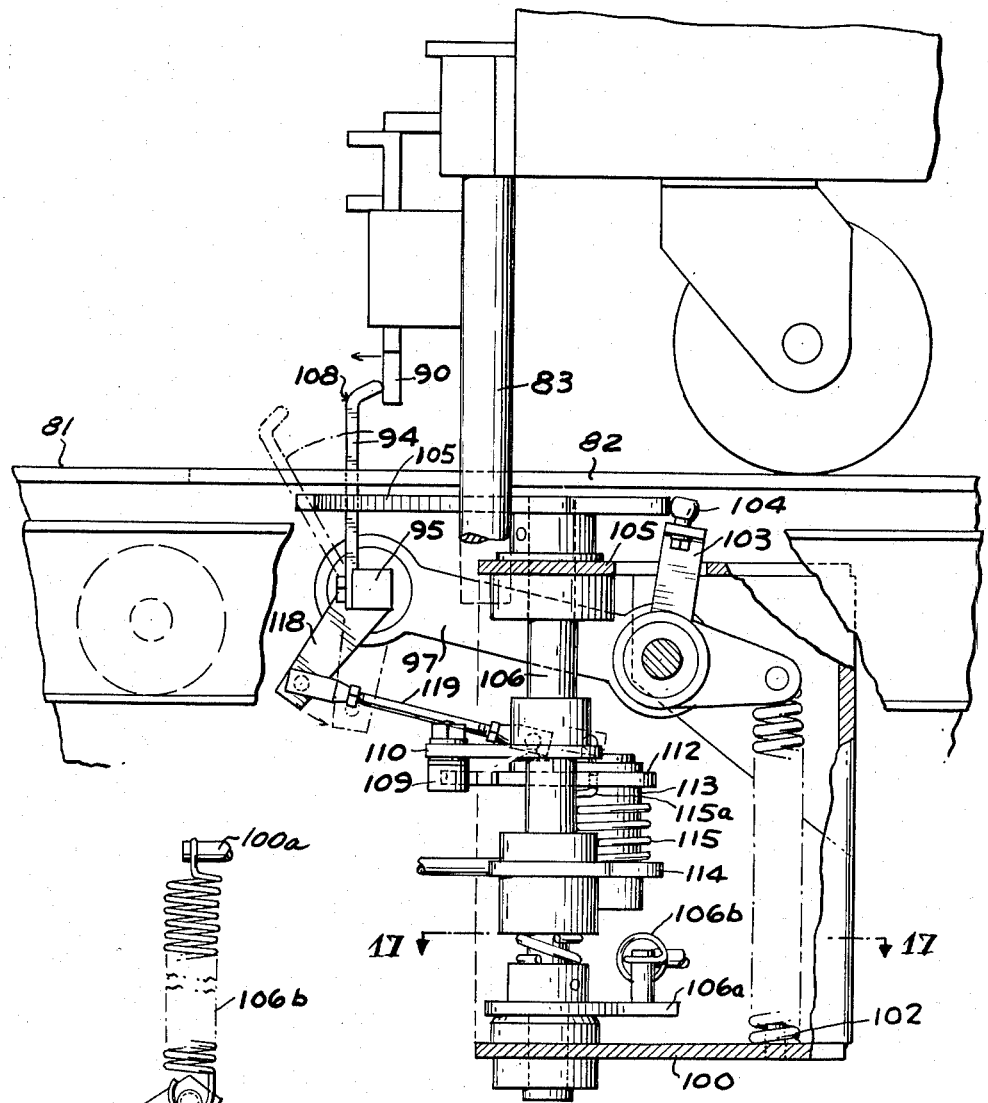
FIG. 16 is a view similar to FIG. 15 showing the relative positions of the parts as a truck moves through the reader station.
Figure 17:
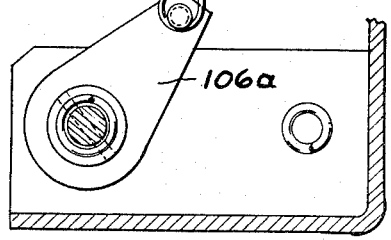
FIG. 17 is a fragmentary sectional view taken along the line 17—17 in FIG. 16.
Figure 18:
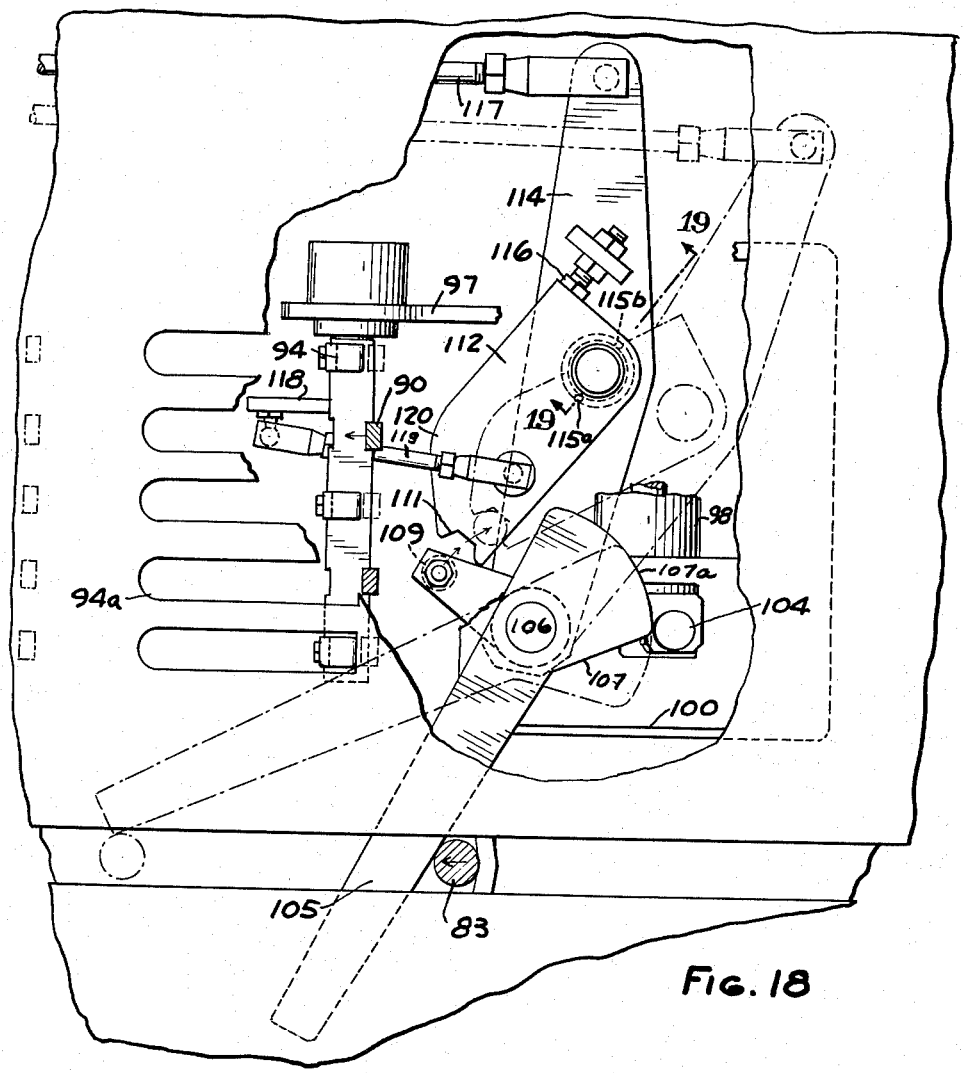
FIG. 18 is a fragmentary plan view similar to FIG. 14 showing the relative positions of the parts in a further operative position for producing a responsive signal.

An upwardly extending projection 103 is fixed on the sleeve 98 (FIG. 16) and supports a roller 104. In addition, an operating lever 105 is fixed on a vertical shaft 106 journalled in the bracket 100. A tension spring 106b extends from a projection 106a fixed on shaft 106 to a pin 100a fixed on bracket 100 (FIGS. 16, 17) and yieldingly urges shaft 106 and, in turn, operating lever 105 counterclockwise as viewed in FIG. 14. As shown in FIG. 14, the operating lever 105 projects into the path of the tow pin 83 so that as the truck is moved along the track 82, the tow pin 83 engages the lever 105, swinging the lever clockwise as shown in FIG. 14 against the action of spring 106b and causing a flat cam surface 107 on the operating lever to engage the roller 104 and swing the lever 97 upwardly bringing the fingers 94 upwardly through slots 94a in the floor into operative sensing relation to the signal pins 90 (FIG. 16). As pin 83 swings lever 105 further roller 104 rides onto surface 107a which is concentric to shaft 106. The upper ends of the pins 94 are turned inwardly toward the oncoming pins 90 as at 108.

Figure 19:
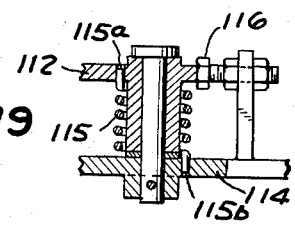
FIG. 19 is a fragmentary sectional view taken along the line 19—19 in FIG. 18.
Figure 20:
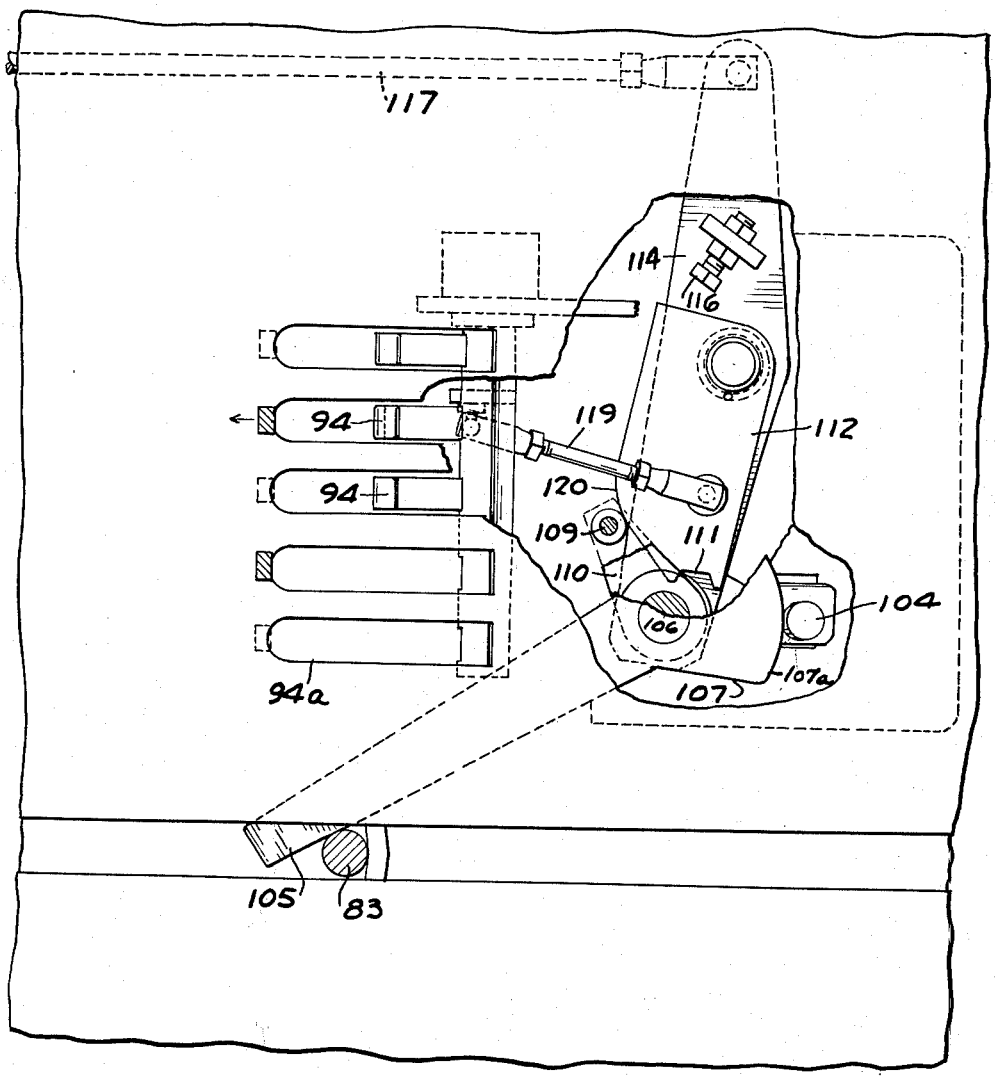
FIG. 20 is a view similar to FIG. 18 showing the relative positions of the parts when a responsive signal is not being produced.

If the fingers 94 are not engaged by the pins 90, then the continued movement of the operating lever 105 by tow pin 83 causes a roller 109 on a projecting arm 110 fixed on the shaft 106 to engage a notch 111 of an actuator link 112 which is pivoted about a vertical axis on a stub shaft 113 fixed on an actuating lever 114 which is pivoted on shaft 106. A helical torsion spring 115 has one end 115a thereof fixed to actuator 112 and the other end 115b thereof fixed to actuator lever 114 and urges actuator link 112 against an adjustable stop 116 on actuator lever 114 (FIG. 19). Movement of the actuating link 112, in turn, causes the actuator lever 114 to swing clockwise and shift an operating rod 117 hinged thereto rightward as shown in dotted line in FIG. 18 and to produce the responsive signal such as, for example, the actuation of the switch.

However, if one of the fingers 94 is engaged by a signal pin 90, then the bar 95 is rotated relative to the lever 97. This causes an arm 118 fixed on the bar 95 to swing counterclockwise as shown in FIG. 16 and, in turn, swing the actuator link 112 counterclockwise (FIG. 20) through a connecting rod 119 against the action of torsion spring 115 so that the notch 111 is moved out of the path of the roller 109 as the operating lever 105 is moved further due to the engagement with the tow pin 83.

As in the previous form of the invention, after the sensing fingers have performed their function, provision is made for moving the sensing fingers 94 out of the path of the signal pins 90 so that the fingers 94 do not tend to push the pins 90 upwardly. This is achieved by engagement of the roller 109 with a cam surface 120 on the actuator link 112. If one or more of the fingers 94 engages a pin 90, and the actuating link 112 is swung counterclockwise, then the further movement of the lever 105 causes the roller 109 to ride on the cam surface 120. This further swings the actuator link 112 counterclockwise moving rod 119 and causing the fingers 94 to be moved counterclockwise as viewed in FIG. 16 and out of the path of the pins 90.

After tow pin 83 clears the operating lever 105, the lever 105 returns to its original position under the action of spring 106b and the sensing fingers 94 are lowered beneath the floor.

*Sub-floor conveyor system switch mechanism*

The movement of the rod 117 in the sub-floor conveyor system which causes a responsive signal can, as previously noted, be used to actuate the switch of a sub-floor conveyor system for diverting the truck to a branch track. As shown more specifically in FIGS. 21 and 22, the movement of the rod 117 can be transmitted to a lever 125 which is pivoted at 126 beneath the floor 80 at the switch point. The lever 125 has an arm 127 which normally urges a roller 128 into engagement with a notch 129 of a switch tongue 130. A tension spring 131 extends between the switch tongue 130 and the arm 127 and tends to urge both the switch tongue 130 and lever arm 127 in a counterclockwise direction. The arm 127 thus normally holds the switch tongue in non-diverting relation as shown in FIG. 21. However, if the rod 117 is moved to the right, as shown in FIG. 21, the lever 125 and, in turn, the arm 127 are swung clockwise moving the roller 128 out of engagement with the notch 129 and permitting the spring 131 to swing the switch tongue 130 into diverting relationship with the track 82. This permits the tow pin 83 to be diverted to the branch track into position where the transfer chain 132 driven by a sprocket 133 can pick up the tow pin through pusher dog 134 and thereby carry the truck along the branch track. In so doing, the tow pin 83 engages the switch tongue extension 135 to return it to the position shown in FIG. 21. The roller 128 is caused to re-enter the notch 129 by the action of spring 131, thereby latching the switch tongue in its original position. The counterclockwise motion of lever 125 ceases when the roller 128 engages the bottom of notch 129.

It can be appreciated that in each of the forms of the invention shown, the responsive signal produced can be negated by a conventional control system in the event that the branch track is not clear to receive a carrier unit.

It can thus be seen that there has been provided a conveyor control system which can be used on overhead or sub-floor conveyor systems to produce a responsive signal without adversely affecting the setting of the pin members. The engagement of the signal pins at a point spaced from their ends results in an initial force on the signal pins which tends to maintain the signal pins in position, rather than move the signal pins out of position. Moreover, the subsequent movement of the signal members or fingers out of the path of the signal pins insures that the setting of the signal pins does not change.

In both forms of the invention, a linkage is normally conditioned so that when the operating member is moved by a carrier unit, a responsive signal is produced. However, if the signal pins engage the sensing members at the reader station, the linkage is made inoperative so that the subsequent movement of the operating member by the actuator on the carrier unit is not transmitted to produce a responsive signal.

I claim:

1. In a conveyor wherein a carrier unit is moved along a path, a control system for selectively producing a responsive signal when the carrier unit moves past a reader station, which comprises
    at least one signal member on said carrier unit, said signal member being movable into and out of signalling position,
    a control mechanism having a least one sensing member movably mounted thereon,
    said signal member being adapted to contact said sensing member when a non-responsive signal is desired and adapted not to contact said sensing member when a responsive signal is desired as the carrier unit moves along the path,
    said control mechanism including an operating member engageable by said carrier unit as the carrier unit moves past the reader station,
    each said carrier unit having an actuator thereon adapted to engage said operating member on said control mechanism as the carrier unit moves past the reader station,
    a mechanical linkage adapted to be actuated by said operating member for producing a responsive signal,
    said linkage being normally conditioned so that when the operating member is operated, a responsive signal is produced,
    means mechanically connected to said sensing member for moving the linkage into inoperative position when the signal member on the carrier unit engages the sensing member so that a responsive signal is not produced when the operating member is operated by said actuator on said carrier unit,
    and means responsive to the engagement of the sensing member by a signal member for moving the sensing member out of the path of the signalling member as the carrier unit moves along the path.

2. The combination set forth in claim 1 wherein a plurality of signal members are provided on said carrier unit, and a plurality of sensing members movable in unison are provided on said control mechanism.

3. The combination set forth in claim 1 including means for moving said sensing member into and out of the path of the carrier unit in response to movement of the carrier unit past the reader station.

4. In a conveyor wherein a carrier unit is moved along a path, a control system for selectively producing a responsive signal when the carrier unit moves past a reader station, which comprises
    at least one signal member on said carrier unit,
    said signal member being movable into and out of signalling position,
    a control mechanism having at least one sensing member movably mounted thereon,
    said signal member being adapted to contact said sensing member when a non-responsive signal is desired and adapted not to contact said sensing member when a responsive signal is desired as the carrier unit moves along the path,
    said control mechanism including an operating member engageable by said carrier unit as the carrier unit moves past the reader station,
    each said carrier unit having an actuator thereon adapted to engage said operating member as the carrier unit moves past the reader station,
    a mechanical linkage adapted to be actuated by said operating member for producing a responsive signal,
    said linkage being normally conditioned so that when the operating member is operated, a responsive signal is produced,
    and means mechanically connected to said sensing member of said control mechanism for moving the linkage into inoperative position when the signal member engages a sensing member so that a responsive signal is not produced when the operating member is operated by said actuator on said carrier unit.

5. The combination set forth in claim 4 wherein a plurality of signal members are provided on said carrier unit, and a plurality of sensing members movable in unison are provided on said control mechanism.

6. The combination set forth in claim 4 including means for moving said sensing member into and out of the path of the carrier unit in response to movement of the carrier unit past the reader station.

7. In a conveyor wherein a carrier unit is moved along a track, a control system for selectively producing a responsive signal when the carrier unit moves past a reader station, which comprises
    at least one signal member on said carrier unit,
    said signal member being movable generally vertically to and from a signalling position,
    a control mechanism having at least one sensing member movably mounted thereon,
    said signal member being adapted to contact said sensing member when a non-responsive signal is desired and adapted not to contact said sensing member when a responsive signal is desired as the carrier unit moves along the track,
    said control mechanism including an operating member engageable by said carrier unit as the carrier unit moves past the reader station,
    means operable to produce a responsive signal when the signal member clears the sensing member as the carrier unit moves past the reader station, and means conditioned by the engagement of a signal member with a sensing member and operable by the operating member such that upon further movement of the carrier unit past the reader station, the sensing member is moved out of engagement with the signal member and clears the signal member.

8. In a conveyor wherein a carrier unit is moved along a track, a control system for selectively producing a responsive signal when the carrier unit moves past a reader station, which comprises at least one signal member on said carrier unit,
said signal member being movable generally vertically to and from a reading position,
a control mechanism having at least one sensing member pivotally mounted thereon,
said signal member being adapted to contact said sensing member when a non-responsive signal is desired and adapted not to contact said sensing member when a responsive signal is desired as the carrier unit moves along the track,
said control mechanism including a pivoted operating member engageable by said carrier unit as the carrier unit moves past the reader station,
each said carrier unit having an actuator thereon adapted to engage and swing said operating member as the carrier unit moves past the reader station,
a mechanical linkage adapted to be actuated by said operating member for producing a responsive signal,
said linkage being normally conditioned so that when the operating member is operated, a responsive signal is produced,
means mechanically connected to said sensing member for moving the linkage into inoperative position when the signal member engages the sensing member so that a responsive signal is not produced when the operating member is operated by said actuator on said carrier unit,
and means responsive to the engagement of a sensing member by a signal member for swinging the sensing member out of the path of the carrier unit as the carrier unit moves along the track.

9. The combination set forth in claim 8 wherein a plurality of signal members are provided on said carrier unit,
and a plurality of sensing members pivotable in unison are provided on said control mechanism.

10. The combination set forth in claim 9 wherein said linkage comprises a pivoted link and means interconnecting said pivoted link and said sensing member.

11. The combination set forth in claim 10 wherein said means for moving said signal member out of the path of the sensing member comprises a cam surface on said link adapted to be engaged by said operating member.

12. In a conveyor wherein a carrier unit is moved along a track, a control system for selectively producing a responsive signal when the carrier unit moves past a reader station, which comprises at least one signal member on said carrier unit,
said signal member being generally vertically to and from a reading position,
a control mechanism having at least one sensing member pivotally mounted thereon,
said signal member being adapted to contact said sensing member when a non-responsive signal is desired and adapted not to contact said sensing member when a responsive signal is desired as the carrier unit moves along the track,
said control mechanism including a pivoted operating member engageable by said carrier unit as the carrier unit moves past the reader station,
each said carrier unit having an actuator thereon adapted to engage said operating member on said control mechanism as the carrier unit moves past the reader station,
a mechanical linkage adapted to be actuated by said operating member for producing a responsive signal,
said linkage being normally conditioned so that when the operating member is operated, a responsive signal is produced,
and means mechanically connected to said sensing member of said control mechanism for moving the linkage into inoperative position when the signal member engages a sensing member so that a responsive signal is not produced when the operating member is operated by said actuator on said carrier unit.

13. The combination set forth in claim 12 wherein said linkage comprises a pivoted link and means interconnecting said pivoted link with said sensing member.

14. The combination set forth in claim 13 wherein said means for moving said signal member out of the path of the sensing member comprises a cam surface on said link adapted to be engaged by said actuator.

15. In an overhead conveyor wherein a carrier unit is moved along a track, a control system for selectively producing a responsive signal when the carrier unit moves past a reader station, which comprises at least one signal member on said carrier unit,
said signal member being movable generally vertically upwardly to and downwardly from a signalling position,
a control mechanism having at least one sensing member movably mounted thereon and projecting downwardly,
said signal member being adapted to contact said sensing member on said carrier unit when a non-responsive signal is desired and adapted not to contact said sensing member when a responsive signal is desired as the carrier unit moves along the track,
said control mechanism including an operating member projecting downwardly and engageable by said carrier unit as the carrier unit moves past the reader station,
each said carrier unit having an actuator thereon adapted to engage said operating member on said control mechanism as the carrier unit moves past the reader station,
a mechanical linkage adapted to be actuated by said operating member for producing a responsive signal,
said linkage being normally conditioned so that when the operating member is operated, a responsive signal is produced,
means mechanically connected to said sensing member of said control mechanism for moving the linkage into inoperative position when the signal on the carrier unit engages the sensing member so that a responsive signal is not produced when the operating member is operated by said actuator on said carrier unit,
and means responsive to the engagement of the sensing member by the signal member for moving the sensing member out of the path of the carrier unit as the carrier unit moves along the track.

16. The combination set forth in claim 15 wherein a plurality of signal members are provided on said carrier unit,
and a plurality of sensing members movable in unison are provided on said control mechanism.

17. In an overhead conveyor wherein a carrier unit is moved along a track, a control system for selectively producing a responsive signal when the carrier unit moves past a reader station, which comprises at least one signal member on said carrier unit,
said signal member being movable generally vertically upwardly to and downwardly from a signalling position, a control mechanism having at least one sensing member pivotally mounted thereon,
said signal member being adapted to contact said sensing member when a non-responsive signal is desired and adapted not to contact said sensing member when a responsive signal is desired as the carrier unit moves along the track,
said control mechanism including an operating member pivoted thereto and projecting downwardly into position for engagement by said carrier unit as the carrier unit moves past the reader station,
each carrier unit having an actuator thereon adapted to engage said operating member as the carrier unit moves past the reader station,
a mechanical linkage adapted to be actuated by said operating member for producing a responsive signal,
said linkage being normally conditioned so that when the operating member is operated, a responsive signal is produced,
and means mechanically connected to said sensing member of said control mechanism for moving the linkage into inoperative position when the signal member engages a sensing member so that a responsive signal is not produced when the operating member is operated by said actuator on said carrier unit.

18. In an overhead conveyor wherein a carrier unit is moved along a track, a control system for selectively producing a resposive signal when the carrier unit moves past a reader station, which comprises
at least one signal member on said carrier unit,
said signal member being movable generally vertically upwardly to and downwardly from a signalling position,
a control mechanism having at least one sensing member pivotally mounted thereon,
said signal member being adapted to contact said sensing member on said carrier unit when a non-responsive signal is desired and adapted not to contact said sensing member when a responsive signal is desired as the carrier unit moves along the track,
said control mechanism including an operating member pivoted thereto engageable by said carrier unit as the carrier unit moves past the reader station,
means operable to produce a responsive signal when the signal member clears the sensing member as the carrier unit moves past the reader station,
and means conditioned by the engagement of a signal member with a sensing member and operable by the operating member such that upon further movement of the carrier unit past the reader station, the sensing member is moved out of engagement with the signal member and clears the signal member.

19. In an overhead conveyor wherein a carrier unit is moved along a track, a control system for selectively producing a responsive signal when the carrier unit moves past a reader station, which comprises
at least one signal member on said carrier unit,
said signal member being movable generally vertically upwardly to and downwardly from a signalling position,
a control mechanism having at least one sensing member pivotally mounted thereon and projecting downwardly,
said signal member being adapted to contact said sensing member when a non-responsive signal is desired and adapted not to contact said sensing member when a responsive signal is desired as the carrier unit moves along the track,
said control mechanism including an operating lever pivoted thereto and projecting downwardly for engagement by said carrier unit as the carrier unit moves past the reader station,
each said carrier unit having a fixed actuator thereon adapted to engage said operating lever as the carrier unit moves past the reader station,
a mechanical linkage adapted to be actuated by said operating lever for producing a responsive signal,
said linkage being normally conditioned so that when the operating lever is operated, a responsive signal is produced,
said linkage comprising a pivoted link,
said operating lever being normally engageable with said link to produce a responsive signal,
means interconnecting said pivoted link with said sensing member for moving said link into inoperative position relative to said operating member when the signal member engages the sensing member on the carrier unit so that a responsive signal is not produced when the operating lever is operated by said actuator on said carrier unit,
and means responsive to the engagement of a sensing member by a signal member for swinging the sensing member out of the path of the carrier unit as the carrier unit moves along the track.

20. The combination set forth in claim 19 wherein said means for moving said signal member out of the path of the sensing member comprises a cam surface on said link adapted to be engaged by said operating member.

21. In an overhead conveyor wherein a carrier unit is moved along a track, a control system for selectively producing a responsive signal when the carrier unit moves past a reader station, which comprises
at least one signal member on said carrier unit,
said signal member being movable generally vertically upwardly to downwardly from a signalling position,
a control mechanism having at least one sensing member pivotally mounted thereon and projecting downwardly,
said signal member being adapted to contact said sensing member when a non-responsive signal is desired and adapted not to contact said sensing member when a responsive signal is desired as the carrier unit moves along the track,
said control mechanism including an operating lever pivoted thereto and projecting downwardly for engagement by said carrier unit as the carrier unit moves past the reader station,
each said carrier unit having a fixed actuator thereon adapted to engage said operating lever as the carrier unit moves past the reader station,
a mechanical linkage adapted to be actuated by said operating lever for producing a responsive signal,
said linkage being normally conditioned so that when the operating lever is operated, a responsive signal is produced,
said linkage comprising a pivoted link,
said operating lever being normally engageable with said link to produce a responsive signal,
and means interconnecting said pivoted link with said sensing member for moving said link into inoperative position relative to said operating lever when the signal member engages the sensing member on the carrier unit so that a responsive signal is not produced when the operating lever is operated by said actuator on said carrier unit.

22. The combination set forth in claim 21 wherein said means interconnecting said pivoted link and said sensing member comprises
an arm on said sensing member having a slot therein,
a pin on said link extending through said slot.

23. The combination set forth in claim 21 wherein said link includes a notch therein,
said operating lever having a member thereon adapted to engage said notch to produce the responsive movement of the link.

24. The combination set forth in claim 21 wherein said link extends generally vertically,
a bell crank pivoted adjacent the upper end of the link.

said link being pivoted to an arm of said bell crank.

25. In a sub-floor conveyor wherein a truck having a tow pin is moved along a slot in the floor, a control system beneath the floor for selectively producing a responsive signal when the truck moves past a reader station, which comprises
  at least one signal member on said truck,
  said signal member being movable generally vertically downwardly to and upwardly from a signalling position,
  a control mechanism having at least one sensing member movably mounted thereon,
  said sensing member being adapted to contact said signal member on said truck when a non-responsive signal is desired and adapted not to contact said signal member when a responsive signal is desired as the truck moves along the track,
  said control mechanism including an operating member engageable by said tow pin on said truck as said truck moves past the reader station,
  a mechanical linkage adapted to be actuated by said operating member for producing a responsive signal,
  said linkage being normally conditioned so that when the operating member is operated, a responsive signal is produced,
  means mechanically connected to said sensing member for moving the linkage into inoperative position when the signal member engages a sensing member so that a responsive signal is not produced when the operating member is operated by said tow pin on said truck,
  means responsive to the engagement of a sensing member by a signal member for moving the sensing member downwardly out of the path of the truck as the truck moves along the track,
  and means for moving said sensing member through the floor into and out of the path of the truck in response to movement of the truck past the reader station.

26. In a sub-floor conveyor wherein a truck having a tow pin is moved along a slot in the floor, a control system beneath the floor for selectively producing a responsive signal when the carrier unit moves past a reader station, which comprises
  at least one signal member on said truck,
  said signal member being movable generally vertically downwardly to and upwardly from a signalling position,
  a control mechanism having at least one sensing member movably mounted thereon,
  said signal member being adapted to contact said sensing member when a non-responsive signal is desired and adapted not to contact said sensing member when a responsive signal is desired as the truck moves along the track,
  said control mechanism including an operating member engageable by said tow pin on the truck as the truck moves past the reader station,
  a mechanical linkage adapted to be actuated by said operating member for producing a responsive signal,
  said linkage being normally conditioned so that when the operating member is operated, a responsive signal is produced,
  and means mechanically connected to said sensing member for moving the linkage into inoperative position when the sensing member engages a signal member so that a responsive signal is not produced when the operating member is operated by said tow pin on said truck.

27. The combination set forth in claim 26 wherein a plurality of signal members are provided on said carrier unit,
  and a plurality of sensing members movable in unison are provided on said control mechanism.

28. The combination set forth in claim 26 including means for moving said sensing member through the floor into and out of the path of the truck in response to movement of the tow pin of the truck past the reader station.

29. In a sub-floor conveyor wherein a truck having a tow pin is moved along a track, a control system beneath the floor for selectively producing a responsive signal when the carrier unit moves past a reader station, which comprises
  at least one signal member on said truck,
  said signal member being movable generally vertically downwardly to and upwardly from a signalling position,
  a control mechanism having at least one sensing member pivotally mounted thereon,
  said signal member being adapted to contact said sensing member on said truck when a non-responsive signal is desired and adapted not to contact said sensing member when a responsive signal is desired as the truck moves along the track,
  said control mechanism including an operating member engageable by the two pin of the truck as the truck moves past the reader station,
  means operable when the signal member clears the sensing member as the truck moves past the reader station to produce a responsive signal,
  and means conditioned by the engagement of a signal member with a sensing member such that upon further movement of the two pin by the truck past the reader station, the sensing member is moved downwardly out of engagement with the signal member and clears the signal member.

30. In a sub-floor conveyor wherein a truck having a tow pin is moved along a slot in the floor, a control system beneath the floor for selectively producing a responsive signal when the truck moves past a reader station, which comprises
  at least one signal member on said truck,
  said signal member being movable generally vertically downwardly to and upwardly from a signalling position,
  a control mechanism having at least one sensing member mounted thereon for movement through the floor and into the path of the truck,
  said signal member being adapted to contact said sensing member when a non-responsive signal is desired and adapted not to contact said sensing member when a responsive signal is desired as the truck moves along the track,
  said control mechanism including an operating member engageable by the tow pin on said truck as the truck moves past the reader station,
  a mechanical linkage adapted to be actuated by said operating member for producing a responsive signal,
  said linkage being normally conditioned so that when the operating member is operated, a responsive signal is produced,
  said linkage comprising a pivoted link,
  said operating member normally engaging said link to produce a responsive signal,
  means interconnecting said pivoted link with said sensing member for moving the link into inoperative position when the signal member engages the sensing member so that a responsive signal is not produced when the operating member is operated by said operating member on said truck,
  and means responsive to the engagement of a sensing member by a signal member for moving the sensing member downwardly out of the path of the carrier unit as the carrier unit moves along the track.

31. The combination set forth in claim 30 wherein said means for moving said signal member out of the path of the sensing member comprises a cam surface on said link adapted to be engaged by said operating member.

32. In a sub-floor conveyor wherein a truck having a tow pin is moved along a slot in the floor, a control system beneath the floor for selectively producing a responsive signal when the truck moves past a reader station, which comprises
- at least one signal member on said truck,
- said signal member being movable generally vertically downwardly to and upwardly from a signalling position,
- a control mechanism having at least one sensing member mounted thereon for movement through the floor and into the path of the truck,
- said signal member being adapted to contact said sensing member when a non-responsive signal is desired and adapted not to contact said sensing member when a responsive signal is desired as the truck moves along the track,
- said control mechanism including an operating member engageable by the tow pin on said truck as the truck moves past the reader station,
- a mechanical linkage adapted to be actuated by said operating member for producing a responsive signal,
- said linkage being normally conditioned so that when the operating member is operated, a responsive signal is produced,
- said linkage comprising a pivoted link,
- said operating member normally engaging said link to produce a responsive signal,
- and means interconnecting said pivoted link with said sensing member for moving the link into inoperative position when the signal member engages the sensing member so that a responsive signal is not produced when the operating member is operated by said tow pin on said truck.

33. The combination set forth in claim 32 wherein said means interconnecting said pivotal link with said sensing member comprises
- an arm fixed to said sensing member and operable to move therewith,
- and a rod extending from said arm to said pivoted link.

34. The combination set forth in claim 32 wherein each said sensing member is mounted on a lever pivoted about a horizontal axis,
- said operating member being operatively connected with said last-mentioned lever to produce upward and downward movement of said sensing member.

35. The combination set forth in claim 32 wherein said pivoted link is formed with a notch,
- said operating member having a member thereon adapted to engage said notch to produce responsive signal motion of said pivoted link.

36. The combination set forth in claim 35 including an actuator arm on which said pivoted link is mounted,
- said arm being adapted to produce a responsive signal in one direction of movement of said pivoted link.

37. In a conveyor wherein a carrier unit is moved along a track, a control system for selectively producing a responsive signal when the carrier unit moves past a reader station, which comprises
- at least one signal member on said carrier unit,
- said signal member being movable generally vertically to and from a signalling position,
- a control mechanism having at least one sensing member movably mounted thereon,
- said sensing member being selectively positioned with an end thereof spaced from an end of said signal member,
- said signal member being adapted to contact said sensing member when a non-responsive signal is desired and adapted not to contact said sensing member when a responsive signal is desired as the carrier unit moves along the track,
- said control mechanism including an operating member engageable by said carrier unit as the carrier unit moves past the reader station,
- each said carrier unit having an actuator thereon adapted to engage said operating member on said control mechanism as the carrier unit moves past the reader station,
- a mechanical linkage adapted to be actuated by said operating member for producing a responsive signal,
- said linkage being normally conditioned so that when the operating member is operated, a responsive signal is produced,
- means mechanically connected to said sensing member for moving the linkage into inoperative position when the signal member on the carrier unit engages the sensing member so that a responsive signal is not produced when the operating member is operated by said actuator on said carrier unit,
- and means responsive to the engagement of the sensing member by a signal member for moving the sensing member out of the path of the carrier unit as the carrier unit moves along the track.

38. A carrier unit movable along a track comprising
- a frame,
- a plurality of horizontally spaced signal pins mounted in generally vertical position on said frame,
- said frame comprising a plurality of generally vertical openings in which said pins are positioned,
- each said pin having oppositely facing notches at longitudinally spaced points thereon,
- said frame including means selectively engageable by said notches to limit the vertical movement of said signal pins outwardly relative to the frame,
- and means on said frame frictionally engaging each said signal pin and tending to retain each said signal pin in vertically adjusted position.

39. In a conveyor wherein a carrier unit is moved along a path, a control system for selectively producing a responsive signal when the carrier unit moves relative to a reader station unit, which comprises
- at least one signal member on one of said carrier unit and said reader station unit,
- said signal member being movable into and out of signalling position,
- a control mechanism on the other of said units having at least one sensing member movably mounted thereon,
- said signal member being adapted to contact said sensing member when a non-responsive signal is desired and adapted not to contact said sensing member when a responsive signal is desired as the carrier unit moves along the path,
- said control mechanism including an operating member,
- an actuator associated with said signal member adapted to engage said operating member as the carrier unit moves relative to the reader station,
- a mechanical linkage adapted to be actuated by said operating member for producing a responsive signal,
- said linkage being normally conditioned so that when the operating member is operated, a responsive signal is produced,
- means mechanically connected to said sensing member for moving the linkage into inoperative position when the signal member engages the sensing member so that a responsive signal is not produced when the operating member is operated by said actuator,
- and means responsive to the engagement of the sensing member by a signal member for moving the sensing member out of the path of the signal member as the carrier unit moves along the path.

40. In a conveyor wherein a carrier unit is moved along a path, a control system for selectively producing a responsive signal when the carrier unit moves relative to a reader station unit, which comprises
- at least one signal member on one of said carrier unit and said reader station unit,
- said signal member being movable into and out of signalling position,
- a control mechanism on the other of said units having at least one sensing member movably mounted thereon, said signal member being adapted to contact said sensing member when a non-responsive signal is desired and adapted not to contact said sensing member when a responsive signal is desired as the carrier unit moves along the path, said control mechanism including an operating member, an actuator associated with said signal member adapted to engage said operating member as the carrier unit moves relative to the reader station, a mechanical linkage adapted to be actuated by said operating member for producing a responsive signal, said linkage being normally conditioned so that when the operating member is operated, a responsive signal is produced, and means mechanically connected to said sensing member for moving the linkage into inoperative position when the signal member engages the sensing member so that a responsive signal is not produced when the operating member is operated by said actuator.

References Cited by the Examiner

UNITED STATES PATENTS

| | | | |
|---|---|---|---|
| 2,949,862 | 8/60 | Klamp | 104—88 |
| 3,045,610 | 7/62 | Klamp | 104—88 |

LEO QUACKENBUSH, *Primary Examiner.*

UNITED STATES PATENT OFFICE
CERTIFICATE OF CORRECTION

Patent No. 3,194,177     July 13, 1965

Leonard J. Bishop

It is hereby certified that error appears in the above numbered patent requiring correction and that the said Letters Patent should read as corrected below.

Column 9, line 61, after "being" insert -- movable --; column 11, line 12, after "each" insert -- said --; column 12, line 32, after "to" insert -- and --; column 14, lines 20 and 27, for "two", each occurrence, read -- tow --.

Signed and sealed this 8th day of March 1966.

(SEAL)
Attest:

ERNEST W. SWIDER
Attesting Officer

EDWARD J. BRENNER
Commissioner of Patents